United States Patent
Fukuda et al.

(10) Patent No.: US 6,261,706 B1
(45) Date of Patent: Jul. 17, 2001

(54) ALUMINUM ALLOY CLAD MATERIAL FOR HEAT EXCHANGERS EXHIBITING HIGH STRENGTH AND EXCELLENT CORROSION RESISTANCE

(75) Inventors: Sunao Fukuda, Handa; Yoshihiko Kamiya, Takahama; Taketoshi Toyama, Anjo; Hirokazu Tanaka, Tajimi; Hiroshi Ikeda; Yoshifusa Shoji, both of Nagoya, all of (JP)

(73) Assignees: Denso Corporation, Aichi; Sumitomo Light Metal Industries, Ltd., Tokyo, both of (JP)

( * ) Notice: Subject to any disclaimer, the term of this patent is extended or adjusted under 35 U.S.C. 154(b) by 0 days.

(21) Appl. No.: 09/413,357

(22) Filed: Oct. 6, 1999

(51) Int. Cl.$^7$ ............... F28F 21/08; B32B 15/20; C22C 21/18
(52) U.S. Cl. ............... 428/654; 428/933; 165/133; 165/134.1; 165/905
(58) Field of Search ............... 428/654, 933; 165/133, 134.1, 180, 905

(56) References Cited

U.S. PATENT DOCUMENTS

| | | | |
|---|---|---|---|
| 4,357,397 | * 11/1982 | Baba et al. | 428/654 |
| 4,571,368 | * 2/1986 | Fenoglio et al. | 428/654 |
| 5,125,452 | * 6/1992 | Yamauchi et al. | 165/133 |
| 5,148,862 | * 9/1992 | Hashiura et al. | 165/134.1 |
| 5,234,759 | * 8/1993 | Inabayashi et al. | 428/330 |
| 5,744,255 | * 4/1998 | Doko et al. | 428/654 |
| 6,165,291 | * 12/2000 | Jin et al. | 148/551 |

FOREIGN PATENT DOCUMENTS

| | | |
|---|---|---|
| 7-41919 | * 2/1995 | (JP) |
| 8-60280 | * 3/1996 | (JP) |
| 10-72632 | * 3/1998 | (JP) |
| 10-72633 | * 3/1998 | (JP) |
| 10-72634 | * 3/1998 | (JP) |
| 10-72635 | * 3/1998 | (JP) |
| 10-88265 | * 4/1998 | (JP) |

\* cited by examiner

Primary Examiner—John J. Zimmerman
(74) Attorney, Agent, or Firm—Flynn Theil Boutell & Tanis, PC

(57) ABSTRACT

An aluminum alloy clad material for heat exchangers exhibiting superior strength after brazing and excellent corrosion resistance is provided. The aluminum alloy clad material comprises a sacrificial anode material which is clad on one side of a core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 $\mu$m or more present in the sacrificial anode material matrix is $2\times10^4$ or less per 1 mm$^2$. The clad material is suitably used as a tube material or header plate material for automotive heat exchangers such as a radiator or heater core.

6 Claims, No Drawings

ALUMINUM ALLOY CLAD MATERIAL FOR HEAT EXCHANGERS EXHIBITING HIGH STRENGTH AND EXCELLENT CORROSION RESISTANCE

BACKGROUND OF THE INVENTION

1. Field of the Invention

The present invention relates to an aluminum alloy clad material for heat exchangers exhibiting high strength and excellent corrosion resistance. More particularly, the present invention relates to an aluminum alloy clad material for heat exchangers exhibiting high strength and excellent corrosion resistance which is suitable as a material for a fluid passage (tube material) and a header plate material for automotive heat exchangers, such as a radiator or heater, joined by brazing using a fluoride-type flux or vacuum brazing, and is also suitable as a piping material connected to such heat exchangers.

2. Description of Background Art

As a tube material or header plate material for automotive heat exchangers such as a radiator or heater, a three-layered aluminum alloy clad material comprising a core material of an Al—Mn alloy such as a JIS3003 alloy which is clad with a brazing material of an Al—Si alloy on one side and a sacrificial anode material of an Al—Zn alloy or Al—Zn—Mg alloy clad on the other side has been used.

The Al—Si brazing material is clad to join a tube to a fin or header plate by brazing. As a brazing method, brazing in an inert gas atmosphere using a fluoride-type flux or vacuum brazing is employed. The sacrificial anode material constitutes the inner surface of the core material and exhibits a sacrificial anode effect by being in contact with a working fluid during use of a heat exchanger, thereby preventing pitting or crevice corrosion in the core material. The fin which is joined to the outer surface of the tube prevents the core material from being corroded by exerting the sacrificial anode effect.

In view of a reduced weight for automotive heat exchangers, the tube material has been provided with high strength by adding Cu to the core material, or by causing Mg and Si to coexist to produce an $Mg_2Si$ compound in the core material and the sacrificial anode material to decrease the thickness of the tube material. Zn in the sacrificial anode material and Cu in the core material interdiffuse when heated for brazing and greatly affect the corrosion resistance. Because of this, the interdiffusion between Zn in the sacrificial anode material and Cu in the core material during heating for brazing has been taken into consideration to provide a clad material with excellent corrosion resistance and improved strength after brazing.

For example, a clad material in which the combination between the thickness of the sacrificial anode material layer and the Zn content is optimized (Japanese Patent No. 2,572,495), and a clad material exhibiting improved corrosion resistance in which the sacrificial anode material contains Zn and the core material contains less than 0.7% of Cu to set the potential difference between the core material layer and the sacrificial anode material layer at 30–120 mV (Japanese Patent Application Laid-open No. 023535/1994) have been proposed. A clad material provided with improved strength and corrosion resistance by adjusting the thickness of the sacrificial anode material layer to 46–70 μm and adding 0.7–2.5% of Cu has also been proposed (Japanese Patent Application Laid-open No. 134574/1996).

A two- or three-layered aluminum alloy clad tube comprising a core material of an Al—Mn alloy such as a JIS3003 alloy clad with a sacrificial anode material of a Al—Zn alloy such as a JIS7072 alloy on either one side or both sides has been used for the passage connecting the automotive heat exchangers. The sacrificial anode material on the inner surface of the clad tube is in contact with a working fluid during use of a heat exchanger and exhibits the sacrificial anode effect, thereby preventing pitting or crevice corrosion in the core material. The sacrificial anode material on the outer surface prevents pitting or crevice corrosion in the core material, which occurs when used under severe conditions.

After brazing, the above conventional aluminum alloy clad materials for heat exchangers exhibit a potential gradient from the surface of the sacrificial anode material layer to the core material owing to interdiffusion between Zn in the sacrificial anode material and Cu in the core material. Corrosion spreads laterally in the direction of the plate width in such a gradient material having the potential gradient, whereby corrosion proceeds slowly to provide the material with excellent corrosion resistance.

However, the effective ranges for securing corrosion resistance in this method are limited because of limitations to the amount of Cu to be added to the core material, or requirement for providing the sacrificial anode material layer with a greater thickness in order to add a greater amount of Cu. If the thickness of the tube material is further reduced, corrosion resistance may be insufficient.

SUMMARY OF THE INVENTION

The present inventors have conducted experiments and studies on corrosion of a gradient material produced by the interdiffusion of Zn of a sacrificial anode material and Cu of a core material. As a result, the inventors have found that large Si compounds and Fe compounds with a potential higher than the matrix present in the sacrificial anode material matrix hinder the gradient function around these compounds as local cathodes, and cause preferential corrosion, thereby preventing corrosion from spreading in the lateral direction.

The present invention has been achieved on the basis of the above findings. In order to provide superior strength and excellent corrosion resistance to a gradient material having a potential gradient from the surface of the sacrificial anode material layer to the core material, which is produced by the interdiffusion of Zn of the sacrificial anode material and Cu of the core material, the inventors have further examined compositions for the core material and sacrificial anode material, combinations thereof, and the relation between the distribution of the compounds in the sacrificial anode material matrix and the performances. Accordingly, an object of the present invention is to provide an aluminum alloy clad material for heat exchangers exhibiting high strength and excellent corrosion resistance which is suitable as a tube material, header plate material, and piping material for heat exchangers, in particular, automotive heat exchangers.

In order to achieve the above object, an aluminum alloy clad material for heat exchangers exhibiting high strength and excellent corrosion resistance according to the present invention comprises a sacrificial anode material clad on one side of a core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 μm or more present in the sacrificial anode material matrix is $2 \times 10^4$ or less per 1 $mm^2$.

A second feature of the present invention is an aluminum alloy clad material comprising a sacrificial anode material clad on one side of a core material and a brazing material of an Al—Si alloy clad on the other side of the core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 μm or more present in the sacrificial anode material matrix is $2 \times 10^4$ or less per 1 mm$^2$.

A third feature of the present invention is an aluminum alloy clad material comprising a sacrificial anode material clad on both sides of a core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 μm or more present in the sacrificial anode material matrix is $2 \times 10^4$ or less per 1 mm$^2$.

According to fourth, fifth, and sixth features of the present invention, the sacrificial anode material further comprises either 0.05% or less of In or 0.05% of Sn, or both, the sacrificial anode material further comprises 2.5% or less of Mg, and the core material further comprises 0.5% or less of Mg, respectively.

Other objects, features and advantages of the invention will hereinafter become more readily apparent from the following description.

DETAILED DESCRIPTION OF THE INVENTION AND PREFERRED EMBODIMENT

The purpose of the use of alloy components and reasons for the limitations therefor will be described below. Mn in the core material improves the strength of the core material. Mn brings the potential of the core material to a higher side and enlarges the potential difference from the sacrificial anode layer, thereby improving corrosion resistance. The Mn content is preferably 0.3–2.0%. If the content is less than 0.3%, the effect is insufficient. If the content exceeds 2.0%, because macromolecules are produced at the time of casting, rolling workability is hindered. As a result, neither a sound plate material nor fine extruded material can be produced. The Mn content is still more preferably 0.8–1.5%.

Cu in the core material improves the strength of the core material. Cu brings the potential of the core material to a lower side and enlarges the potential difference from both the sacrificial anode layer and the brazing material, thereby improving corrosion resistance. Cu in the core material diffuses into the sacrificial anode material and the brazing material when heated for brazing to form a gentle concentration gradient. As a result, the potential of the core material becomes higher and the potential of the surface of the sacrificial anode material and the surface of the brazing material becomes lower. Because a gentle potential gradient is formed in the sacrificial anode material and the brazing material, corrosion spreads over the whole surface in the lateral direction. The Cu content is preferably 0.25–1.0%. If the content is less than 0.25%, the effect is insufficient. If the content exceeds 1.0%, corrosion resistance of the core material decreases, and local fusion tends to occur during brazing due to the decreased melting point. The Cu content is still more preferably 0.4–0.6%.

Si in the core material improves the strength of the core material. Si forms a fine Mg$_2$Si compound in the presence of Mg which has diffused from the sacrificial anode material layer during brazing and causes age-hardening after brazing, thereby further improving the strength. The Si content is preferably 0.3–1.1%. If the content is less than 0.3%, the effect is insufficient. If the content exceeds 1.1%, corrosion resistance decreases and local fusion tends to occur during brazing due to the decreased melting point. The Si content is still more preferably 0.3–0.7%.

Ti in the core material is deposited separately in a high-concentration area and in a low-concentration area. These areas are distributed alternately in layers in the direction of the plate thickness of the material. Because the low Ti concentration area is preferentially corroded rather than the high Ti concentration area to form corroded layers, corrosion in the direction of the plate thickness is prevented, thereby improving pitting resistance of the material. The Ti content is preferably 0.05–0.35%. If the content is less than 0.05%, the effect is insufficient. If the content exceeds 0.35%, moldability is impaired. Moreover, a sound material cannot be produced due to decreased workability.

Mg in the core material improves the strength of the core material. The content of Mg is preferably 0.5% or less (but more than 0%) to avoid hindering brazability. If the content exceeds 0.5%, Mg reacts with a flux during brazing in an inert gas atmosphere using a fluoride-type flux to hinder brazability. Moreover, a fluoride of Mg is produced, thereby impairing the appearance of the brazed part. In the case of vacuum brazing, a melted braze tends to erode the core material. The content of Mg is still more preferably 0.15% or less. If even 0.5% or less of Fe, 0.2% or less of Cr, 0.3% or less of Zr, and 0.1% or less of B are included in the core material as impurities, characteristics of the core material are not affected.

Zn in the sacrificial anode material brings the potential of the sacrificial anode material to a lower side and maintains the sacrificial anode effect to the core material to prevent pitting or crevice corrosion of the core material. The Zn content is preferably 1.5–8%. If the content is less than 1.5%, the effect is insufficient. If the content exceeds 8%, self-corrosion resistance decreases. The Zn content is still more preferably 2.0–6.0%.

Si in the sacrificial anode material forms Si compounds in the sacrificial anode material matrix. If the total number of particles of the Si compounds and Fe compounds, which is described later, with a particle diameter (circle equivalent diameter) of 1 μm or more present is $2 \times 10^4$ or less per 1 mm$^2$, the sacrificial anode effect effectively functions by using a potential gradient from the surface of the sacrificial anode material layer to the core material. The Si content is preferably 0.01–0.8%. When the content is 0.8% or less, the above-described compound distribution is produced. If the content exceeds 0.8%, the sacrificial anode effect is hindered. The Si content is still more preferably 0.01–0.5%.

Fe in the sacrificial anode material forms Fe compounds in the sacrificial anode material matrix. If the total number of particles of the Fe compounds and the Si compounds with a particle diameter (circle equivalent diameter) of 1 μm or more present is $2 \times 10^4$ or less per 1 mm$^2$, the sacrificial anode effect effectively functions by using a potential gradient from the surface of the sacrificial anode material layer to the core material. The Fe content is preferably 0.01–0.3%. When the content is 0.3% or less, the above distribution of the compounds is produced. If the content exceeds 0.3%, the sacrificial anode effect is hindered. The Fe content is still more preferably 0.01–0.2%.

In in the sacrificial anode material brings the potential of the sacrificial anode material to a lower side and ensures the sacrificial anode effect on the core material. The In content is preferably 0.05% or less (but more than 0%). If the content exceeds 0.05%, self-corrosion resistance of the sacrificial anode material and rolling workability decrease. The In content is still more preferably 0.01–0.02%.

Sn in the sacrificial anode material brings the potential of the sacrificial anode material to a lower side and secures the sacrificial anode effect on the core material. The Sn content is preferably 0.05% or less (but more than 0%). If the content exceeds 0.05%, self-corrosion resistance of the sacrificial anode material and rolling workability decrease. The Sn content is still more preferably 0.01–0.02%.

Mg in the sacrificial anode material forms $Mg_2Si$ in the presence of Si and is finely dispersed in the sacrificial anode material matrix. Mg prevents deposition of aluminum hydroxide which forms a film on the surface of the material under corrosive conditions. As a result, formation of the film is hindered and pitting is dispersed, whereby the occurrence of through-pits is prevented. The Mg content is preferably 2.5% or less (but more than 0%). If the content exceeds 2.5%, self-corrosion resistance decreases. The Mg content is still more preferably less than 1.5%.

If even 0.05% or less of Cu, 0.2% or less of Cr, 0.3% or less of Ti, 0.3% or less of Zr, and 0.1% or less of B are included in the sacrificial anode material, performance of the aluminum alloy clad material of the present invention is not affected.

The aluminum alloy clad material for heat exchangers of the present invention is manufactured by casting the aluminum alloys constituting the core material, sacrificial anode material, and the brazing material by semicontinuous casting, for example. After homogenization as required, the materials are rolled to a predetermined thickness by hot rolling. The materials are assembled into a clad material by hot rolling according to a conventional method. The clad material is rolled by cold rolling to a predetermined thickness and then annealed, as required. In the present invention, the Si compounds and Fe compounds are dispersed in the sacrificial anode material matrix by adjusting the casting conditions of the aluminum alloy for the sacrificial anode material. The continuous casting is preferably carried out at a temperature of 730–800° C. and a cooling rate of 10–50° C./second.

When forming a tube material for automotive heat exchangers such as a radiator or heater, a clad plate is formed by curving the aluminum alloy clad material of the present invention and welding or brazing the joint to form a tube shape. In the case of a two-layered clad material comprising a core material and sacrificial anode material, the sacrificial anode material is used as an inner layer which is in contact with a working fluid, and an aluminum alloy fin material clad with an Al—Si brazing material on both sides is joined to an outer layer of the core material by brazing to assemble a heat exchanger.

In the case of a three-layered clad material in which a sacrificial anode material is disposed on both sides of the core material, a sacrificial anode material layer forms both an inner layer and an outer layer. The inner layer is in contact with a working fluid and prevents corrosion of the core material layer by exerting the sacrificial anode effect. The outer layer protects the core material layer by exerting the sacrificial anode effect under corrosive conditions. An aluminum alloy fin material clad with an Al—Si brazing material on both sides is joined to the outer layer by brazing.

In the case of a three-layered clad material in which an Al—Si brazing material is clad on one side of a core material and a sacrificial anode material is clad on the other side, the sacrificial anode material layer forms an inner layer and is in contact with a working fluid, and a brazing material layer forms an outer layer. An aluminum alloy fin material is joined to the outer layer by brazing to assemble a heat exchanger.

As a brazing method, brazing in an inert gas atmosphere using a fluoride-type flux or vacuum brazing is employed. In the aluminum alloy clad material of the present invention, an Al—Si alloy brazing material comprising 6–13% of Si is used in the inert gas atmosphere brazing, and an Al—Si—Mg brazing material is used in the vacuum brazing. In vacuum brazing, an Al—Si—Mg alloy brazing material comprising 6–13% of Si and 0.5–3.0% of Mg as essential components is used. The brazing material may comprise either 0.2% or less of Bi or 0.2% or less of Be, or both, in order to improve brazability.

EXAMPLES

Example 1

An aluminum alloy for the core material with a composition as shown in Table 1 and an aluminum alloy for the brazing material (JIS BA4343, Si content: 7.5%) were cast by continuous casting. The aluminum alloy for the core material was homogenized. An aluminum alloy for the sacrificial anode material with a composition as shown in Table 2 was cast. The continuous casting of the aluminum alloy for the sacrificial anode material was carried out at a temperature of 740° C. and a cooling rate of 15° C./second.

An ingot of the aluminum alloys for the sacrificial anode and for the brazing material was rolled to a predetermined thickness by hot rolling, and then rolled with an ingot of the aluminum alloy for the core material by hot rolling to provide a clad material. The clad material was rolled by cold rolling, annealed, and then rolled by final cold rolling to obtain a clad plate (temper: H14) with a thickness of 0.25 mm. The thickness of the brazing material layer and the sacrificial anode material layer of the clad plate was 0.025 mm and 0.025–0.050 mm, respectively.

Si compounds and Fe compounds in the resulting aluminum alloy clad plate material were measured and the strength after brazing, corrosion resistance, and brazability were evaluated according to the following methods. The results are shown in Tables 3 and 4.

(1) Measurement of Si Compounds and Fe Compounds in the Sacrificial Anode Material The total number of particles of the Si compounds and Fe compounds with a particle diameter (circle equivalent diameter) of 1 μm or more was measured using a picture analysis device.

(2) Strength After Brazing

A fluoride-type flux was applied to the clad plate material, the clad plate material was heated at a brazing temperature of 600° C. (material temperature) in a nitrogen gas atmosphere. The clad plate material was then cooled before performing a tensile test for measuring tensile strength.

(3) Corrosion Resistance Evaluation 1

A fluoride-type flux was applied to the clad plate material, which was heated at a brazing temperature of 600° C. (material temperature) in a nitrogen gas atmosphere. A corrosion test was performed on the side of the sacrificial anode material layer by the following method to evaluate corrosion resistance of the inner layer.

Corrosive Solution:

$Cl^-$: 195 ppm, $SO_4^{2-}$: 60 ppm, $Cu^{2+}$: 1 ppm, $Fe^{3+}$: 30 ppm

Method: Repeating a heat cycle consisting of heating at 88° C. for 8 hours and cooling to hold at 25° C. for 16 hours for three months (4) Corrosion Resistance Evaluation 2

A corrugated fin of an aluminum alloy containing 1.6% of Mn, 0.3% of Cu, and 1.0% of Zn with a thickness of 0.08 mm was placed on the side of the brazing material of the clad plate material. The clad plate material was brazed at 600° C. in a nitrogen gas atmosphere using a fluoride-type flux. Corrosion resistance of the side of the brazing material (outer surface) was evaluated by a CASS test.

(5) Evaluation of Brazability

A corrugated fin of an aluminum alloy containing 1.6% of Mn, 0.3% of Cu, and 1.0% of Zn with a thickness 0.08 mm was placed on the side of the brazing material of the clad plate material. The clad plate material was brazed at 600° C. in a nitrogen gas atmosphere using a fluoride-type flux. Brazability was evaluated by the observation of joining conditions and occurrence or non-occurrence of melting in the brazed part.

TABLE 1

| Core material | Composition (wt %) | | | | | |
|---|---|---|---|---|---|---|
| | Si | Fe | Mn | Cu | Ti | Mg |
| A1 | 0.50 | 0.20 | 1.20 | 0.50 | 0.15 | — |
| A2 | 0.65 | 0.25 | 1.50 | 0.60 | 0.15 | — |
| A3 | 1.00 | 0.20 | 1.65 | 0.70 | 0.15 | — |
| A4 | 0.70 | 0.25 | 1.40 | 0.60 | 0.15 | — |
| A5 | 0.30 | 0.25 | 1.30 | 0.40 | 0.15 | — |
| A6 | 1.10 | 0.20 | 1.20 | 0.30 | 0.15 | — |
| A7 | 0.40 | 0.20 | 0.35 | 0.60 | 0.15 | — |

TABLE 1-continued

| Core material | Composition (wt %) | | | | | |
|---|---|---|---|---|---|---|
| | Si | Fe | Mn | Cu | Ti | Mg |
| A8 | 0.60 | 0.20 | 1.90 | 0.30 | 0.15 | — |
| A9 | 0.50 | 0.25 | 1.20 | 0.25 | 0.15 | — |
| A10 | 0.40 | 0.25 | 1.00 | 1.00 | 0.05 | — |
| A11 | 0.50 | 0.20 | 1.20 | 0.50 | 0.15 | 0.25 |
| A12 | 0.40 | 0.20 | 0.80 | 0.60 | 0.35 | — |
| A13 | 0.40 | 0.25 | 1.50 | 0.60 | 0.15 | 0.12 |

TABLE 2

| Sacrificial anode material | Composition (wt %) | | | | | |
|---|---|---|---|---|---|---|
| | Si | Fe | Zn | In | Sn | Mg |
| a1 | 0.40 | 0.10 | 2.50 | — | — | — |
| a2 | 0.40 | 0.10 | 2.20 | 0.02 | — | — |
| a3 | 0.40 | 0.10 | 2.20 | — | 0.02 | — |
| a4 | 0.40 | 0.10 | 2.30 | — | — | 1.45 |
| a5 | 0.40 | 0.10 | 2.30 | — | — | 2.00 |
| a6 | 0.50 | 0.30 | 2.20 | — | — | — |
| a7 | 0.80 | 0.10 | 2.30 | — | — | — |
| a8 | 0.40 | 0.20 | 1.50 | — | — | — |
| a9 | 0.40 | 0.15 | 8.00 | — | — | — |
| a10 | 0.40 | 0.10 | 2.00 | 0.04 | — | — |
| a11 | 0.40 | 0.10 | 2.00 | — | 0.04 | — |
| a12 | 0.40 | 0.15 | 6.00 | — | — | — |
| a13 | 0.40 | 0.10 | 4.00 | — | — | — |

TABLE 3

| Test material | Combination | | Thickness of sacrificial anode material (mm) | Number of particles with a particle diameter of 1 μm per 1 mm² | Tensile strength after brazing (MPa) | Maximum corrosion depth (mm) | | Brazability |
|---|---|---|---|---|---|---|---|---|
| | Core material | Sacrificial anode material | | | | Inner surface | Outer surface | |
| 1 | A1 | a1 | 0.025 | 5 × 10³ | 150 | 0.10 | 0.09 | Good |
| 2 | A1 | a1 | 0.040 | 5 × 10³ | 150 | 0.06 | 0.09 | Good |
| 3 | A1 | a1 | 0.050 | 5 × 10³ | 150 | 0.05 | 0.09 | Good |
| 4 | A2 | a1 | 0.040 | 5 × 10³ | 155 | 0.08 | 0.08 | Good |
| 5 | A3 | a1 | 0.040 | 5 × 10³ | 170 | 0.09 | 0.07 | Good |
| 6 | A4 | a1 | 0.040 | 5 × 10³ | 160 | 0.07 | 0.08 | Good |
| 7 | A5 | a1 | 0.040 | 5 × 10³ | 135 | 0.05 | 0.10 | Good |
| 8 | A6 | a1 | 0.040 | 5 × 10³ | 150 | 0.04 | 0.11 | Good |
| 9 | A7 | a1 | 0.040 | 5 × 10³ | 140 | 0.07 | 0.08 | Good |
| 10 | A8 | a1 | 0.040 | 5 × 10³ | 165 | 0.08 | 0.11 | Good |
| 11 | A9 | a1 | 0.040 | 5 × 10³ | 140 | 0.04 | 0.12 | Good |
| 12 | A10 | a12 | 0.040 | 5 × 10³ | 150 | 0.08 | 0.06 | Good |
| 13 | A11 | a1 | 0.040 | 5 × 10³ | 145 | 0.06 | 0.08 | Good |
| 14 | A12 | a1 | 0.040 | 5 × 10³ | 140 | 0.08 | 0.06 | Good |
| 15 | A13 | a1 | 0.040 | 5 × 10³ | 160 | 0.06 | 0.12 | Good |

(Notes) Number of particles with a particle diameter of 1 μm or more: number of Si compounds and Fe compounds in sacrificial anode material layer matrix, maximum corrosion depth: inner surface; sacrificial anode material layer, outer surface; brazing material layer, brazability: Good; joined well and exhibited no melting

TABLE 4

| Test material | Combination Core material | Sacrificial anode material | Thickness of sacrificial anode material (mm) | Number of particles with a particle diameter of 1 μm per 1 mm² | Tensile strength after brazing (MPa) | Maximum corrosion depth (mm) Inner surface | Maximum corrosion depth (mm) Outer surface | Brazability |
|---|---|---|---|---|---|---|---|---|
| 16 | A1 | a2 | 0.040 | 5 × 10³ | 150 | 0.05 | 0.09 | Good |
| 17 | A2 | a3 | 0.040 | 5 × 10³ | 155 | 0.07 | 0.08 | Good |
| 18 | A1 | a4 | 0.040 | 5 × 10³ | 170 | 0.06 | 0.10 | Good |
| 19 | A2 | a5 | 0.040 | 5 × 10³ | 190 | 0.07 | 0.07 | Good |
| 20 | A1 | a6 | 0.040 | 1 × 10⁴ | 150 | 0.07 | 0.09 | Good |
| 21 | A2 | a7 | 0.040 | 6 × 10³ | 155 | 0.08 | 0.08 | Good |
| 22 | A1 | a8 | 0.040 | 8 × 10³ | 150 | 0.07 | 0.10 | Good |
| 23 | A2 | a9 | 0.040 | 5 × 10³ | 155 | 0.09 | 0.08 | Good |
| 24 | A1 | a10 | 0.040 | 5 × 10³ | 150 | 0.07 | 0.09 | Good |
| 25 | A2 | a11 | 0.040 | 5 × 10³ | 155 | 0.07 | 0.07 | Good |
| 26 | A1 | a12 | 0.025 | 5 × 10³ | 150 | 0.04 | 0.09 | Good |
| 27 | A1 | a12 | 0.040 | 5 × 10³ | 150 | 0.05 | 0.09 | Good |
| 28 | A1 | a12 | 0.060 | 5 × 10³ | 150 | 0.08 | 0.09 | Good |
| 29 | A1 | a13 | 0.025 | 5 × 10³ | 150 | 0.04 | 0.08 | Good |
| 30 | A1 | a13 | 0.040 | 5 × 10³ | 150 | 0.06 | 0.09 | Good |
| 31 | A1 | a13 | 0.060 | 5 × 10³ | 150 | 0.09 | 0.10 | Good |

As shown in Tables 3 and 4, test materials according to the present invention exhibited superior tensile strength of 130 MPa or more after brazing and superior corrosion resistance with a maximum corrosion depth of less then 150 μm in the corrosion test. As for brazability, the test materials did not exhibit local fusion and were joined well.

Comparative Example 1

An aluminum alloy for the core material with a composition as shown in Table 5, an aluminum alloy for the sacrificial anode material with a composition as shown in Table 6, and an alloy for the brazing material (JlS BA4343) were cast by continous casting to provide an aluminum alloy clad plate material (temper: H14) with a thickness of 0.25 mm under the same conditions differing from Example 1. Tensile strength after brazing of the resulting clad plate material was measured and corrosion resistance and brazability were evaluated according to the methods of Example 1. The results are shown in Tables 7 and 8.

TABLE 5

| Core material | Composition (wt%) Si | Fe | Mn | Cu | Ti | Mg |
|---|---|---|---|---|---|---|
| B1 | 0.20 | 0.25 | 0.70 | 0.30 | 0.15 | — |
| B2 | 1.30 | 0.20 | 0.70 | 0.20 | 0.15 | — |
| B3 | 0.50 | 0.20 | 0.20 | 0.30 | 0.15 | — |
| B4 | 0.50 | 0.25 | 2.50 | 0.40 | 0.15 | — |
| B5 | 0.50 | 0.20 | 1.00 | 0.10 | 0.15 | — |

TABLE 5-continued

| Core material | Composition (wt%) Si | Fe | Mn | Cu | Ti | Mg |
|---|---|---|---|---|---|---|
| B6 | 0.50 | 0.20 | 1.10 | 1.50 | 0.15 | — |
| B7 | 0.50 | 0.25 | 1.20 | 0.50 | 0.15 | 1.00 |
| B8 | 0.50 | 0.20 | 1.20 | 0.50 | 0.01 | — |
| B9 | 0.50 | 0.25 | 1.20 | 0.50 | 0.40 | — |

TABLE 6

| Sacrificial anode material | Composition (wt%) Si | Fe | Zn | In | Sn | Mg |
|---|---|---|---|---|---|---|
| b1 | 1.00 | 0.15 | 2.50 | — | — | — |
| b2 | 0.50 | 0.40 | 2.50 | — | — | — |
| b3 | 0.40 | 0.10 | 1.00 | — | — | — |
| b4 | 0.30 | 0.10 | 9.00 | — | — | — |
| b5 | 0.40 | 0.10 | 2.50 | — | — | 3.00 |
| b6 | 0.30 | 0.10 | 2.20 | 0.10 | — | — |
| b7 | 0.30 | 0.10 | 2.20 | — | 0.10 | — |

TABLE 7

| Test material | Combination Core material | Sacrificial anode material | Thickness of sacrificial anode material (mm) | Number of particles with a particle diameter of 1 μm per 1 mm² | Tensile strength after brazing (MPa) | Maximum corrosion depth (mm) Inner surface | Maximum corrosion depth (mm) Outer surface | Brazability |
|---|---|---|---|---|---|---|---|---|
| 32 | B1 | a1 | 0.040 | 5 × 10³ | 95 | 0.09 | 0.12 | Bad |
| 33 | B2 | a1 | 0.040 | 5 × 10³ | — | — | — | Bad |

TABLE 7-continued

| Test material | Combination Core material | Sacrificial anode material | Thickness of sacrificial anode material (mm) | Number of particles with a particle diameter of 1 μm per 1 mm² | Tensile strength after brazing (MPa) | Maximum corrosion depth (mm) Inner surface | Maximum corrosion depth (mm) Outer surface | Brazability |
|---|---|---|---|---|---|---|---|---|
| 34 | B3 | a1 | 0.040 | 5 × 10³ | 85 | 0.19 | 0.18 | Good |
| 35 | B4 | a1 | 0.040 | 5 × 10³ | — | — | — | — |
| 36 | B5 | a1 | 0.040 | 5 × 10³ | 100 | Perforation | 0.18 | Good |
| 37 | B6 | a1 | 0.040 | 5 × 10³ | — | — | — | Bad |
| 38 | B7 | a1 | 0.040 | 5 × 10³ | — | — | — | Bad |
| 39 | B8 | a1 | 0.040 | 3 × 10³ | 150 | 0.08 | 0.2 | Good |
| 40 | B9 | a1 | 0.040 | 5 × 10³ | — | — | — | — |
| 41 | A1 | b1 | 0.040 | 5 × 10³ | 150 | 0.2 | 0.09 | Good |
| 42 | A1 | b2 | 0.040 | 5 × 10³ | 150 | 0.16 | 0.08 | Good |
| 43 | A1 | b2 | 0.040 | 5 × 10³ | 150 | Perforation | 0.07 | Good |
| 44 | A1 | b4 | 0.040 | 5 × 10³ | 150 | 0.2 | 0.08 | Good |
| 45 | A1 | b5 | 0.040 | 5 × 10³ | 190 | 0.16 | 0.08 | Good |
| 46 | A1 | b6 | 0.040 | — | — | — | — | — |
| 47 | A1 | b7 | 0.040 | — | — | — | — | — |

(Notes) Brazability: Bad: insufficiently joined or local fusion occurred

TABLE 8

| Test material | Combination Core material | Sacrificial anode material | Thickness of sacrificial anode material (mm) | Number of particles with a particle diameter of 1 μm per 1 mm² | Tensile strength after brazing (MPa) | Maximum corrosion depth (mm) Inner surface | Maximum corrosion depth (mm) Outer surface | Brazability |
|---|---|---|---|---|---|---|---|---|
| 48 | A1 | a1 | 0.040 | 4 × 10⁴ | 150 | 0.2 | 0.2 | Good |
| 49 | A6 | a1 | 0.040 | 3 × 10⁴ | 145 | 0.2 | 0.2 | Good |

(Notes) Sacrificial anode material a1 for materials Nos. 48 and 49 was cast at a temperature of 700° C. and cooling rate 0.5° C./second.

As shown in Tables 7 and 8, test materials which did not satisfy the conditions according to the present invention were inferior in any one of strength after brazing, corrosion resistance, and brazability. Test material No. 33 exhibited local fusion during brazing due to the high Si content in the core material. Because test material No. 35 contained a large amount of Mn in the core material, a sound plate material was not produced due to decreased workability. Test materials Nos. 37 and 38 exhibited inferior brazability due to the high Cu content and the high Mg content in the core material, respectively. Because test material No. 40 contained a large amount of Ti in the core material, a sound plate material was not produced due to decreased workability. Because test materials Nos. 46 and 47 contained a large amount of In and Sn in the core material, respectively, a sound plate material was not produced due to decreased workability. Test materials Nos. 48 and 49 exhibited inferior corrosion resistance due to the great number of Si compounds and Fe compounds with a particle diameter of 1 μm or more per 1 mm² in the matrix since the sacrificial anode material was cast according to commonly used continuous casting conditions. According to the present invention, an aluminum alloy clad material for heat exchangers exhibiting superior strength after brazing and excellent corrosion resistance is provided. The clad material is suitably used as a tube material constituting a fluid passage for automotive heat exchangers and a piping material connecting heat exchangers.

Obviously, numerous modifications and variations of the present invention are possible in light of the above teachings. It is therefore to be understood that, within the scope of the appended claims, the invention may be practiced otherwise than as specifically described herein.

What is claimed is:

1. An aluminum alloy clad material for heat exchangers exhibiting high strength and excellent corrosion resistance comprising a sacrificial anode material which is clad on one side of a core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 μm or more present in the sacrificial anode material matrix is 2×10⁴ or less per 1 mm².

2. An aluminum alloy clad material for heat exchangers exhibiting high strength and excellent corrosion resistance comprising a sacrificial anode material which is clad on one side of a core material and a brazing material of an Al—Si alloy which is clad on the other side of the core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 µm or more present in the sacrificial anode material matrix is $2\times10^4$ or less per 1 mm$^2$.

3. An aluminum alloy clad material for heat exchangers exhibiting high strength and excellent corrosion resistance comprising a sacrificial anode material which is clad on both sides of a core material, wherein the core material comprises an aluminum alloy comprising 0.3–2.0% of Mn, 0.25–1.0% of Cu, 0.3–1.1% of Si, and 0.05–0.35% of Ti with the remaining portion consisting of aluminum and impurities, the sacrificial anode material comprises an aluminum alloy comprising 1.5–8% of Zn, 0.01–0.8% of Si, and 0.01–0.3% of Fe with the remaining portion consisting of aluminum and impurities, and the total number of particles of Si compounds and Fe compounds with a particle diameter (circle equivalent diameter) of 1 µm or more present in the sacrificial anode material matrix is $2\times10^4$ or less per 1 mm$^2$.

4. The aluminum alloy clad material for heat exchangers exhibiting high strength and excellent corrosion resistance according to claim 1, wherein the sacrificial anode material further comprises either 0.05% or less of In or 0.05% or less of Sn, or both.

5. The aluminum alloy clad material for heat exchangers exhibiting high strength and excellent corrosion resistance according to a claim 1, wherein the sacrificial anode material further comprises 2.5% or less of Mg.

6. The aluminum alloy clad material for heat exchangers exhibiting high strength and excellent corrosion resistance according to claim 1, wherein the core material further comprises 0.5% or less of Mg.

* * * * *